June 10, 1958     I. SISLIK ET AL     2,837,955
PUSH-ON FASTENER HAVING SETS OF TEETH
AT DIFFERENT LEVELS
Filed May 14, 1952     4 Sheets-Sheet 1
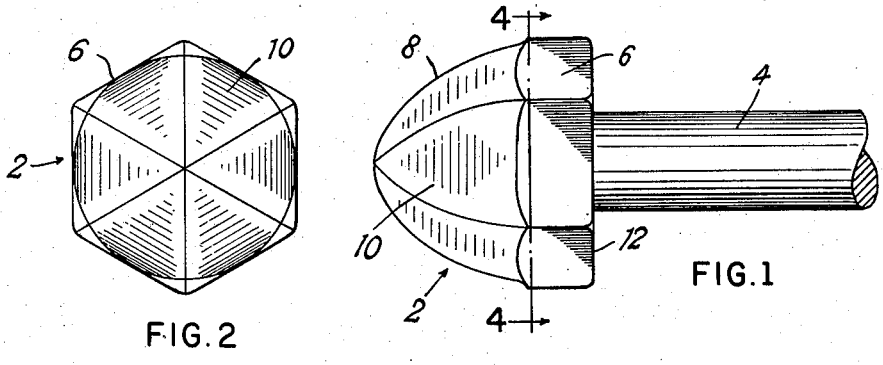
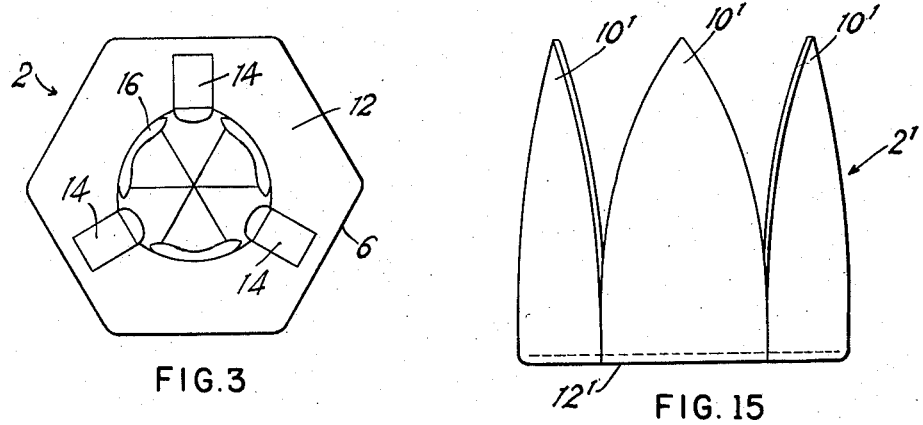
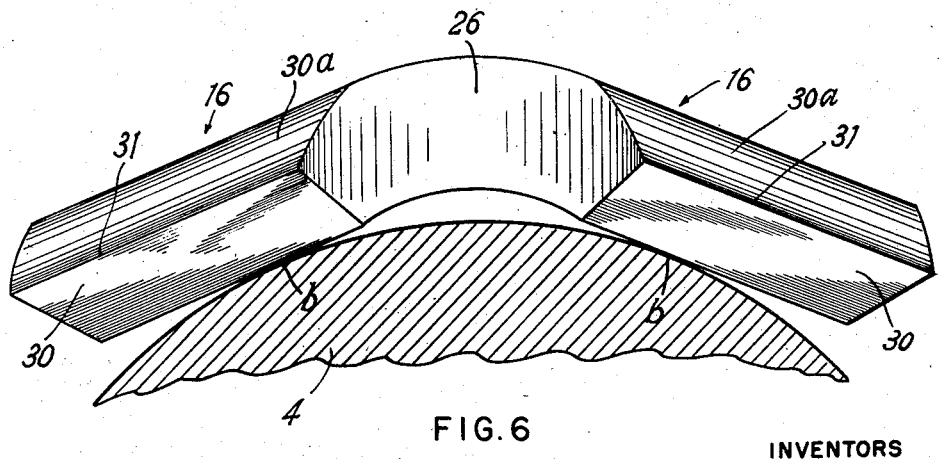
INVENTORS
Ivan Sislik
William B. Duffy
BY
ATTORNEYS INVENTORS
Ivan Sislik
William B. Duffy
BY
Ramey, Chisholm & Hilder
ATTORNEYS

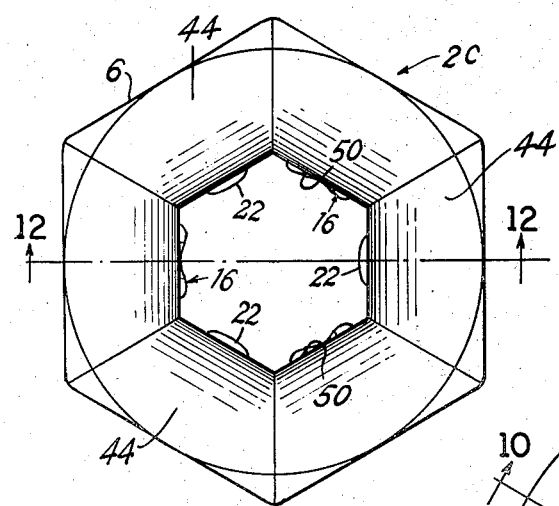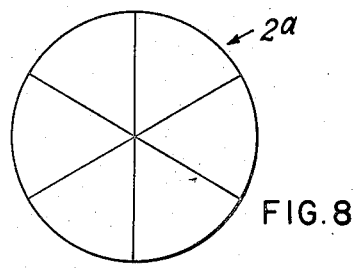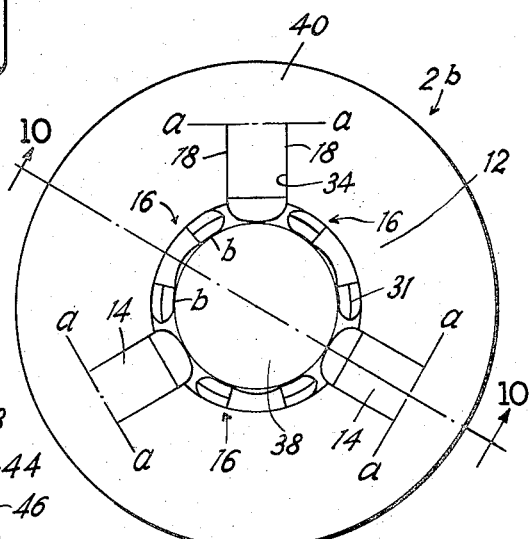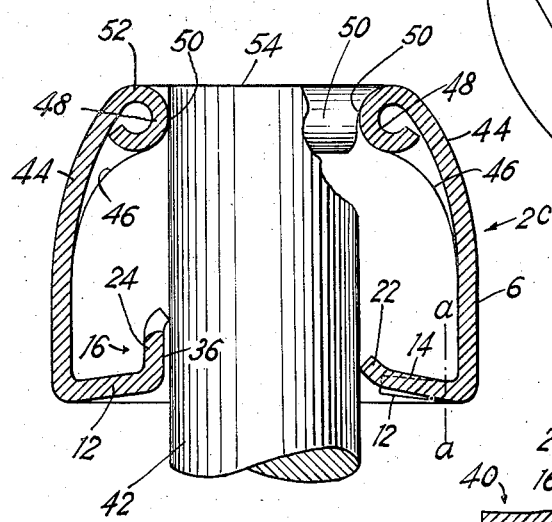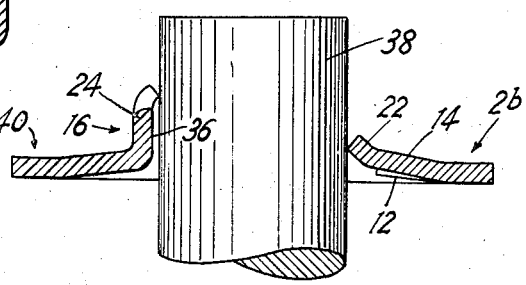

United States Patent Office 2,837,955
Patented June 10, 1958

2,837,955

PUSH-ON FASTENER HAVING SETS OF TEETH AT DIFFERENT LEVELS

Ivan Sislik, Bound Brook, and William B. Duffy, Newark, N. J., assignors to The Palnut Company, Irvington, N. J., a corporation of New Jersey Application May 14, 1952, Serial No. 287,698

6 Claims. (Cl. 85—36)

This invention relates to an improved sheet metal fastener of the push-on type, including a method of making the same and an assembly made therefrom. Fasteners of this type are sometimes called threadless sheet-metal nuts. The fastener of the invention is designed to be employed as a load-sustaining member on a stud or shaft which is usually in the form of a smooth-surfaced cylinder; and the fastener is designed to be applied to the stud or shaft by essentially purely axial movement with respect thereto.

Push-on fasteners have been used in large quantities, and are being used in increasingly larger numbers, especially in installations wherein light sheet metal or plastic trim or the like is held on various devices, as in automobile dashboards and on radio cabinets, etc. In such cases, the fastener is called upon to resist only relatively little axial thrust, and various types of prior art fasteners have been adequate for such purposes. For such uses, push-on fasteners possess marked economy over threaded nuts, since push-on fasteners are known which may be cheaply made and easily applied, and since the stud or shaft need not be threaded.

For more rigorous applications, however, wherein the fastener during use is called upon to resist quite substantial axial thrust, and wherein the fastener is also liable to be subjected to repeated side impacts, prior art sheet metal push-on fasteners have not been altogether satisfactory. One such typical use is that of a wheel-retaining fastener on the end of a baby carriage or doll carriage axle. In such case, not only must the fastener retain the wheel on the axle against substantial axial thrust but, if the fastener is to be adequate, it must be capable of sustaining numerous side blows, as by being struck against curbs and posts while the carriage is being wheeled. In addition to such stability, i. e., the ability to withstand shocks both sidewardly and endwardly and still retain a high holding strength, a successful push-on fastener for rugged uses should be capable of being pushed axially onto the stud or shaft without the use of inconveniently large force.

Some types of prior art sheet metal push-on fasteners have been unduly hard to apply to the stud or shaft. Typical of such prior fasteners are those employing a multiplicity of stiff, radially projecting fingers having their tips located in one transverse plane. Certain prior art sheet metal push-on fasteners which have been easy to apply have been unstable as regards canting on the stud or shaft, have been weak in resistance to mechanical shocks, and have possessed poor holding strength. Furthermore, some prior art sheet metal push-on fasteners vary widely as to performance with rather small variations in the diameter of the shaft or stud to which they are applied; thus, in a run of similar prior art push-on fasteners, there will be a wide variation in their holding strengths when applied to shafts which merely vary in diameter within commercial tolerances.

Among the objects of the present invention are to provide an improved sheet metal push-on fastener which is capable of easy application to a shaft or stud, to provide an improved sheet metal push-on fastener which has high load-sustaining capacity, to provide an improved sheet metal push-on fastener which has high stability against canting on the shaft, and to provide an improved sheet metal push-on fastener which retains adequate holding force after repeated side impacts.

Another object of the invention resides in the provision of a sheet metal push-on fastener of the type indicated, which is not unduly critical with respect to the size of the shaft or rod with which it is used; in other words, a push-on fastener which in any one size may be used successfully with no great difference in stability and holding force on shafts or studs whose diameters lie within commercial tolerances.

A further object of the invention lies in the provision of an improved one-piece sheet metal push-on fastener which is capable of rapid, accurate, inexpensive manufacture on a quantity production basis.

A still further object of the invention resides in the provision of an improved method of making the indicated type of sheet metal fastener.

Further objects, and objects relating to details of construction, manufacture, and use will be apparent from the detailed disclosure which follows.

Our invention is defined in the claims. Where parts are, for clarity and convenience, referred to on the basis of their oriented position shown in the drawings or in any other oriented position, no limitation as to the positioning of the entire structure is to be implied, since the fastener-and-stud assembly can be used in any position. Also, in both the description and the claims, parts may at times be identified by specific names for clarity and convenience, but such nomenclature is to be understood as having the broadest meaning consistent with the context and with the concept of our invention as distinguished from the pertinent prior art. The best forms in which we have contemplated applying our invention are illustrated in the accompanying drawings forming part of this specification. All views of the drawings are on an enlarged scale, and some views are on a very large scale. In the drawings:

Fig. 1 (Sheet 1) is a view in side elevation of a first form of sheet metal push-on fastener embodying the present invention, the fastener being shown on a shaft.

Fig. 2 (Sheet 1) is a top plan view of such fastener, i. e., showing the fastener per se as it would appear when viewed from the left of Fig. 1.

Fig. 3 (Sheet 1) is a bottom plan view of the same fastener.

Figure 5:
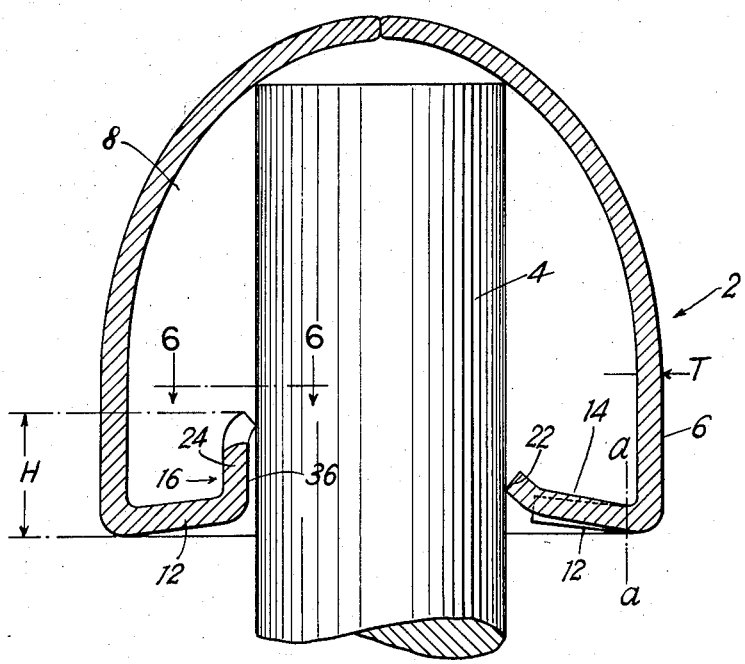
Figure 4:
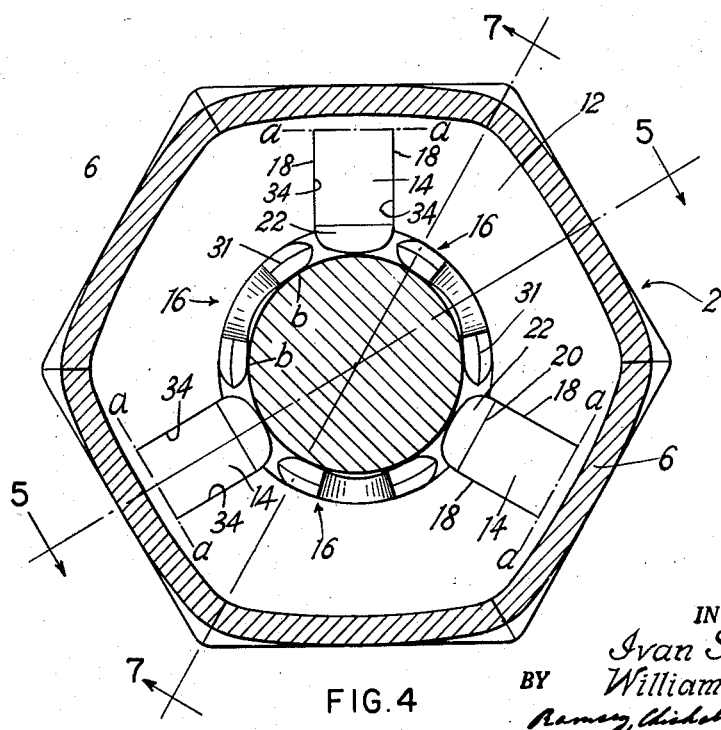
Fig. 4 (Sheet 2) is a cross section through the first form of fastener and the shaft, on a larger scale, the plane of the view being indicated by line 4—4 of Fig. 1.

Fig. 5 (Sheet 2) is a longitudinal section through the first form of fastener, applied to a shaft, the section being taken generally on the line 5—5 of Fig. 4, and the shaft being shown in elevation. This view shows, at the right of the figure, one of the lower fingers or teeth of the fastener as it cooperates with the shaft, and shows at the left of the figure, one of the upper fingers or teeth of the fastener as it cooperates with the shaft.

Fig. 6 (Sheet 1) is a somewhat diagrammatic detail view, on a very large scale, showing one of the upper teeth when viewed from a plane corresponding generally to that of line 6—6 in Fig. 5.

Figure 7:
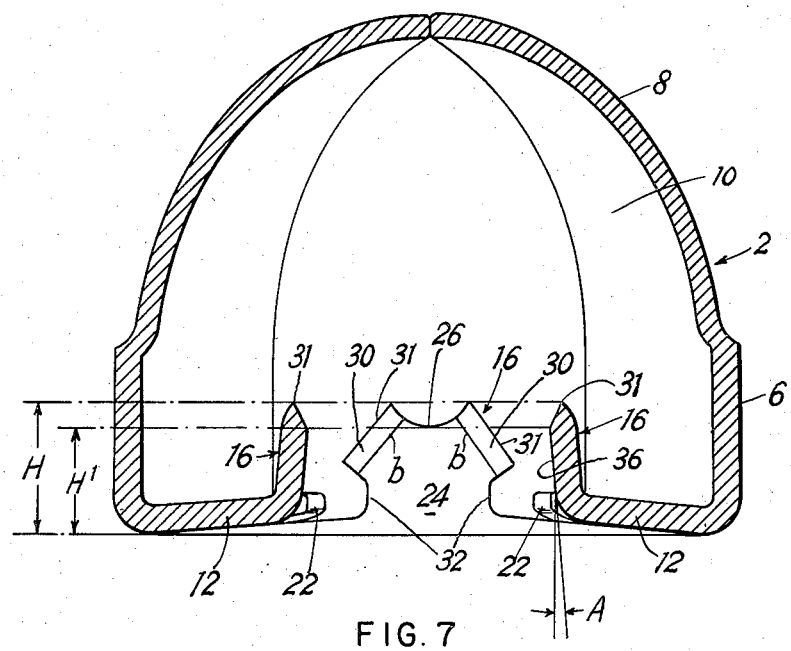

Fig. 7 (Sheet 4) is a longitudinal section of the first form of fastener per se, taken generally on the line 7—7 of Fig. 4 (Sheet 2). This view shows two of the upper gripping teeth in section at the right and left of the fastener and one of such upper teeth at the center in elevation.

Fig. 8 (Sheet 3) is a top plan view, similar to Fig. 2, illustrating a second form of fastener embodying the present invention.

Fig. 9 (Sheet 3) is a plan view of a third form of fastener embodying the invention, the fastener being shown applied to a stud.

Fig. 10 (Sheet 3) is a section taken generally on the line 10—10 of Fig. 9, the stud being shown in elevation.

Fig. 11 (Sheet 3) is a plan view of a fourth form of fastener embodying the present invention.

Fig. 12 (Sheet 3) is a longitudinal section through the fastener of Fig. 11, taken generally on line 12—12 of Fig. 11. The view shows the fastener applied to a shaft, and the shaft is shown in elevation with a portion thereof shown broken away at the upper right to aid in depicting the fastener.

Figure 13:
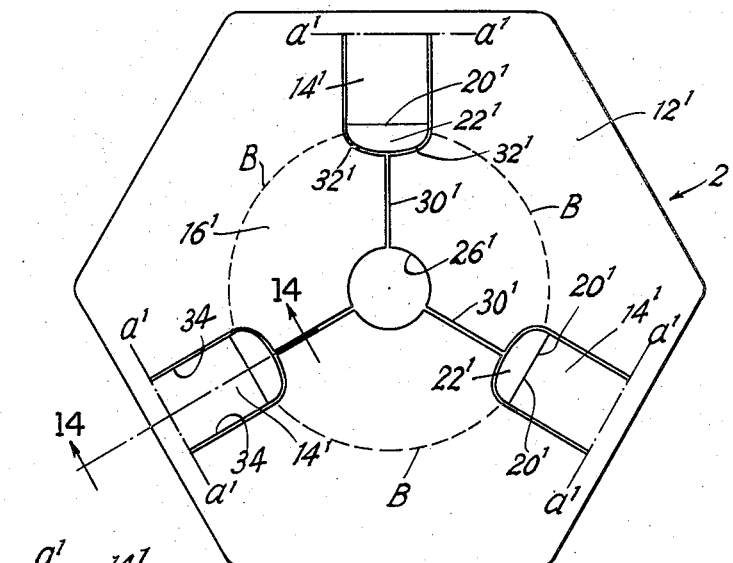

Fig. 13 (Sheet 4) is a bottom plan view of a partially formed preferred type of blank from which the aforesaid first and fourth forms of fasteners may be made, illustrating a preferred method of forming such fasteners.

Figure 14:
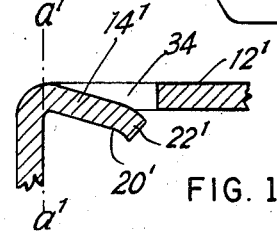

Fig. 14 (Sheet 4) is a detail section taken generally on the line 14—14 of Fig. 13.

Fig. 15 (Sheet 1) is an elevation of the partially formed fastener blank shown in Fig. 13.

Of the four forms of fastener shown, the first and second forms are dome-shaped, the third form is washer-shaped, and the fourth form is dome-shaped with an open top. The first form is fastener 2, shown in Figs. 1 through 7. The second form is fastener 2a, shown in Fig. 8. The third form is fastener 2b, shown in Figs. 9 and 10. The fourth form is fastener 2c, shown in Figs. 11 and 12. The structure and operation of the shaft-gripping portion of the fastener is the same in all four forms, and will be described in detail only in connection with the first form, viz., fastener 2. In fasteners 2a, 2b, and 2c parts that are the same as those in fastener 2 will be designated by the same reference characters. Steps in forming a dome-shaped fastener embodying the invention will be described in connection with Figs. 13, 14, and 15.

A one-piece dome-shaped fastener embodying the invention, designated as a whole by 2, is shown in Fig. 1 as being applied to the end of a shaft or stud 4, which may be the axle of a baby carriage or doll carriage. The fastener 2 has a lower portion 6 of hexagonal form, which is positioned innermost with respect to the shaft. The fastener also has an upper portion 8 which is domed and hides the end of the shaft 4 on which the fastener is placed. The portion 8 of the fastener is formed of a plurality, six in this instance, of in-bent petal-shaped gores or leaves 10 which meet at the axially outer end of the fastener and close the same. The fastener also has a base portion which is an annular web 12, and integral with the web are fastener-centering shaft-gripping elements.

As shown in various figures of the drawing, the web 12 has a centrally located stud-receiving opening therethrough. Such web is substantially flat and may be given a slight frusto-conical form as shown in Figs. 5 and 7. The web 12 incorporates a first set (plurality) of radially-disposed equally-spaced stud-gripping teeth 14, such teeth being located substantially at the level of the web. In preferred embodiments of the invention, the teeth of such first set, once the fastener has been applied to the shaft, are substantially rigid in a radial direction, and strongly engage the shaft under compression, so as to contribute a large amount of the total load-sustaining capacity of the fastener. Integral with the web 12 are additional shaft-gripping means, preferably a second set (plurality) of equally spaced teeth 16, the teeth of the second set extending away from the web 12 in directions substantially parallel to the axis of the fastener. The shaft-gripping portions of the teeth of the second set are spaced a substantial distance axially of the fastener from the teeth of the first set, whereby the installed fastener has marked stability against being permanently tipped away from its axis even by strong side blows. The shaft-gripping portions of the teeth of the second set project radially inward at least slightly from the main portions of such teeth, thereby giving those teeth a desired resilience of holding and shaft-centering without appreciably reducing the ultimate sidewise strength of these teeth.

Referring to Figs. 3, 4, and 5, there are three radially projecting lower fingers or teeth 14 incorporated in the web 12 of the fastener, and three upper fingers or teeth 16 integral with the web. The three teeth 14 constitute a first set of teeth, and the three teeth 16 constitute a second set of teeth. The teeth 14 and 16 are equally spaced angularly about the axis of the nut, the teeth 14 alternating with the teeth 16. When the fastener is on a shaft of the intended diameter (see Figs. 4 and 5), the edges 18 of the teeth 14 are in edge-to-edge engagement with the metal of the web 12, and this edge-to-edge engagement extends throughout the greater part of the length of the teeth 14. The method of forming the teeth 14 will be described later. However, it may be noted now that each tooth 14 is integral with the web 12 at line a—a in Fig. 4 and that the web transversely grips each tooth 14 with substantial frictional engagement between the edges 34, 34 of the web 12 and the edges 18, 18 of the tooth. The inner ends of the teeth 14 are rounded in plan as is seen in Fig. 4; and the tip of each of such teeth is bent upwardly in the direction of travel of the end of the shaft into the fastener (see Fig. 5), which contributes to the ease of the initial application of the fastener to the shaft.

In the fastener as made and before its initial application to the shaft, the main portion of the length of each tooth 14, except for the up-bent tip 22 thereof, lies within the slot from which it was cut, so that the top and bottom surfaces of the tooth lie substantially flush with the top and bottom surfaces of the web 12 of the fastener. The manner of formation of the fastener to be described later in its preferred embodiment, preferably removes little or no stock from the blank in forming the cuts defining edge surfaces 18 and 34. Thus, an edge surface 18 taken with its companion edge surface 34, defines a slit whose width is preferably zero (in effect). In other words, the teeth 14 constitute a part of the web 12 of the fastener, the body of each tooth 14 being defined by two spaced slits extending inwardly of the web. Other subsequent operations performed upon the fastener, both at the base and dome thereof, may cause the edge surfaces 34 tightly to embrace the edge surfaces 18 of the teeth or fingers 14. The pressure of such engagement between the surfaces 18 and 34 is kept low enough, however, to permit the upward displacement of teeth 14 to the position shown in Fig. 5 when the male member or shaft 4 is introduced within the fastener, without the use of undue force to apply the fastener to the shaft.

When the fastener on the shaft is subjected to an axial load extending in an upward direction as the fastener is shown in Fig. 5, the fingers 14 strongly resist travel of the fastener upwardly with respect to the shaft. In thus opposing removal of the fastener from the shaft, the fingers 14 which are relatively short and thus quite rigid and which are preferably laterally braced by reason of the engagement between edge surfaces 18 and 34, have a toggle-like wedging action. When in engagement with the shaft, the fingers 14 are inclined upwardly somewhat, as shown in Fig. 5. When it is attempted to withdraw the fastener from the shaft, frictional engagement between the shaft and tips 22 of the teeth 14 will tend to force the teeth 14 downwardly, such teeth tending then to bend throughout their entire length but mostly along the line a—a. If substantial frictional engagement between edges 18 and 34 is present, such downward movement of the teeth 14 is also opposed by the frictional grip exerted on the tooth edges 18, 18 by the edges 34, 34 of the web 12 of the fastener. It will also be noted that, by reason of the engagement of each edge 18 with the contiguous edge 34, the teeth 14 are braced sidewardly by the remainder of the web of the fastener; in fact, the web 12 has circumferential continuity, which well adapts it to resist side blows on the fastener.

The shape of the upper fingers or teeth 16 will be apparent from a consideration of Figs. 4, 5, 6, and 7. Each tooth 16 has a body 24 which is arcuate in section perpendicular to the axis of the fastener. The main portion of the shaft-confronting face 36 of the tooth body 24 is a substantially cylindrical surface having a radius that is somewhat longer than the radius of the shaft-receiving hole of the fastener; and this gives the shaft-receiving hole of the fastener the noncircular, flat-wheel shape seen in Fig. 3. The vertical center line of the shaft-confronting face 36 of the tooth body 24 is slightly spaced from the surface of the shaft when the fastener is in normal coaxial position thereon as indicated in Fig. 5. In the preferred embodiments of the fastener shown, each of the teeth 16 grips the shaft 4 at two downwardly inclined edge zones b (see Figs. 6 and 7) that are at the bottom of surfaces 30, 30 which will be referred to later. Such zones b are more or less tangent to an imaginary cylinder coaxial with the fastener, such cylinder being of somewhat smaller diameter than the imaginary cylinder upon which the vertical center lines of the shaft-confronting faces of the teeth 16 lie. In the fastener 2 applied to the shaft 4 as shown in Fig. 6, the tips of the inner ends 22 of teeth 14 (see also Figs. 3 and 5) lie on the same imaginary cylinder as that upon which portions b, b of teeth 16 lie. In the fastener before application to the shaft, like approximate conditions hold, that is, the inner ends 22 of the lower teeth 14 lie on approximately the same imaginary cylinder as the shaft-engaging zones b of the upper teeth. However, such imaginary cylinder for the installed fastener is of slightly larger diameter than such imaginary cylinder for the uninstalled fastener.

The body 24 of each tooth 16 has at the central upper portion thereof an upwardly concave arcuate surface 26 (Fig. 7), whereby the upper end of the tooth is forked. Extending from each terminal portion of surface 26 is a downwardly slanting portion at 31 (Fig. 7). As will be seen from Fig. 6, the reference character 31 is applied to the ridge of the downwardly slanting portion; and from this ridge a flat face 30 extends downwardly on the shaft-confronting side, while a convex face 30a extends downwardly on the opposite side. Below the lower termini of such downwardly slanting portions of teeth 16, in the illustrated embodiments of the fastener, such teeth neck inwardly at 32, 32 as shown in Fig. 7. This inward-necking is formed by the cutting or striking out of the rounded inner ends 22 of the teeth 14 from the blank, as will be apparent from the discussion of Fig. 13 hereinafter.

The main shaft-confronting face 36 of body 24 of each tooth 16, as has been described above, normally lies spaced outwardly slightly from the surface of the shaft 4. In addition thereto, as will be apparent from a consideration of Figs. 5 and 7, teeth 16 converge slightly towards the shaft 4, lying at a small angle A (Fig. 7) with respect to the vertical. Such relationships, in addition to the upwardly concave surface 26 on tooth 16, result in the normal engagement of teeth 16 with shaft 4 at the two described zones b on each tooth. By reason of such engagement between the teeth 16 and the shaft 4, the teeth 16 function to accurately center the fastener with respect to the shaft and hold it centered. In addition, as will appear, teeth 16 also contribute a substantial part of the total axial load-sustaning capacity of the fastener.

The fastener of the invention is formed of sheet metal stock such as spring steel, which is hardened and tempered after completion of the forming operations. Thus, the stock of the fastener, including the portions of teeth 16 adjacent to the shaft-gripping zones b, is markedly resilient. Accordingly, in the embodiments of the fastener shown, wherein the shaft-gripping zones b project radially inwardly slightly beyond the main portion of the shaft-confronting face of teeth 16, the upper portions of the teeth 16 will flex to absorb a side blow on an installed fastener and will then return the fastener to its normal coaxial position on the shaft. The flexing of the upper portions of the teeth 16 is within the elastic limit of the metal even if the side blow on the fastener be great enough to force the main shaft-confronting face 36 of one of the teeth 16 into contact with the shaft 4. When this happens, further lateral displacement of the fastener is very strongly resisted by the contact between the upstanding strong main body portion 24 of the tooth 16 and the shaft. As a result, an installed fastener of the invention will sustain many repeated small side blows, and also some fairly large side blows, before it fails to return to a position coaxial with the shaft or before its load-sustaining capacity is much, if any, decreased.

It has been found, as a result of tests conducted upon commercial quarter-inch size sheet metal fasteners of the type described mounted on commercial quarter-inch cold rolled steel shafts, that such fasteners have an axial load-sustaining capacity of about 250 pounds. To such 250 pound total, it has been found that the larger or upper teeth 16 contribute about 60 pounds and that the lower teeth 14 contribute about 190 pounds. In other words, the top teeth hold about one-fourth of the axial load and the bottom teeth hold about three-fourths of such load. Commercial quarter-inch cold rolled steel rod, used for such applications as doll carriage axles and the like, varies in actual size from .247 to .250 inch in diameter. It has been found that the fastener of the invention when made in quarter-inch size to commercial tolerances, will have about the same load holding or sustaining capacity when used with any rod falling within the above commercial tolerances.

It has also been found, in carrying out the invention, that, in order to realize its maximum advantages, the total height H (Fig. 7) of the large teeth 16 should not be less than four times the thickness of the metal stock from which the fastener and teeth are made. The distance H' between the bottom of the fastener and the shaft-gripping zones b is somewhat less than height H. When such minimum ratio of total tooth height to tooth thickness radially thereof is observed, the teeth 16 have a sufficient length to afford yieldable displacement of the shaft-gripping portions b sufficient to give the fastener the described capacity to withstand side blows. Further, when the teeth 16 have such minimum axial length, they also provide a substantial length of inner surface to contact the shaft when the fastener has been laterally displaced to extreme position by a side blow. A satisfactory sheet metal push-on fastener in accordance with the invention has been made for one-quarter inch shafts from spring steel stock having a thickness of .024 inch, the height H of the teeth 16 being about six times such thickness, i. e., about .150 inch.

The push-on fastener 2a shown in Fig. 8 is likewise of the dome-shaped type. Fastener 2a differs from fastener 2 only in that the lower portion thereof is of circular cylindrical rather than hexagonal form.

The washer-type push-on fastener 2b, shown in Figs. 9 and 10 omits the upper portion of the fastener and is somewhat more economical to manufacture than are the fasteners 2, 2b, and 2c. Body 40, which constitutes the base portion of the fastener 2b, is preferably made of a diameter somewhat exceeding the diameter of the base portion of the fastener 2, in order to give such body 40 the necessary ring strength to resist the thrust upon the teeth 14 in a radially outward direction. The inner portion 12 of body 40 is the same as the web 12 of fastener 2. As above set forth, the lower teeth 14 and the upper teeth 16 of the fastener 2b cooperate with the shaft 38 in the same manner as the corresponding teeth of the previously described fastener 2 cooperate with shaft 4. The fastener of Figs. 9 and 10 will, therefore, ordinarily be employed, for reasons of economy, where it is not required that the teeth 14 and 16 and the end of shaft 38 shall be hidden from view. Further, fastener 2b is not restricted in its use to a position on the end of a shaft.

In Figs. 11 and 12 there is shown a dome-shaped push-on fastener 2c having an open top. The base portion 12 and the sets of teeth 14 and 16 are essentially the same as those of the dome-shaped push-on fastener 2, which was described first. The dome-shaped push-on fasteners 2 and 2a (Figs. 1–7 and 8, respectively) will be preferred for some uses because of their better appearance. However, if fastener 2 or 2a is pounded with a hammer to drive it onto the shaft, the top of the dome-shaped formation will be more or less smashed. Furthermore, if fasteners 2 and 2a be forced too far on the shaft in any manner, the end of the shaft may strike the top of the dome and force the petals apart. The open top form of fastener 2c (Figs. 11 and 12) overcomes these difficulties. In addition, by the use of a shaft of the proper length, the open top fastener 2c can be hammered flush with the shaft end, thereby securing the proper non-clamping relationship with the wheel or other part to be retained by the fastener. It is obvious, however, that fastener 2c is not limited to use on the end of a stud since by use of a sleeve-like tool it may be pushed on to the stud as far as desired.

The fastener 2c has a dome-shaped open top formed by the converging petal-like formations 44 which meet along their edges 46. The upper end portions of such formations 44, however, are curled inwardly at 48 to form a plurality of surfaces 50 which are substantially straight horizontally but are markedly curved in an axial direction. Such inner surfaces 50 of portions 48 lie at such distances from the axis of the fastener as to form a passage having a free-sliding fit with the shaft 42. In Fig. 11 the ends 22 of the lower teeth and portions of the upper teeth 16 are shown as protruding into slightly overlapping relationship with the passage through fastener 2c afforded by surfaces 50. It will be understood that the amount shown of such protrusion of the teeth is illustrative only, and that the relationship is one which results in the teeth gripping the shaft while the passage at 50 makes a free-sliding fit with the shaft.

As mentioned, the fastener 2c is adapted for installation on the shaft as by a hammering operation, which can readily be carried out by a storekeeper or home mechanic without special tools. When such fastener 2c is driven onto the shaft 42 by a hammer, the outer surface 54 of the shaft functions as a stop for the hammer so that the outer end 52 of the fastener lies flush with the end of the shaft. The fastener 2c is quite resistant to hammer blows used to drive it onto the shaft and, when installed, is quite resistant to fortuitous side blows.

If fastener 2 (Figs. 1 and 2) be hammered onto a shaft, the blows strike the point-like tips of petals 10 which have little strength against displacement and crushing. With fastener 2c (Figs. 11 and 12) the hammer blows are received by the bead-like portions at 48. Such bead-like portions are resistant to crushing and they are supported by the main body of the petals 44, which main body is curved in horizontal section, as is the outer wall of the bead-like formations. This results in a structure which is quite resistant to deformation, particularly since the entire fastener is hardened and tempered after being formed.

It will be apparent that the fasteners of the invention may be manufactured in a variety of ways to give them the described functional elements with the described relationships with respect to each other. A presently preferred method of making such fasteners will be described in connection with the dome-shaped embodiment thereof, reference being had to Figs. 13, 14, and 15. In Figs. 13 and 15 there is shown a partially formed blank for making a dome-shaped fastener, Fig. 13 being a bottom plan and Fig. 15 being an elevation. Parts of the blank which are similar to those found in the finished fastener are designated by the reference characters above used in describing the fastener 2 but with an added prime.

In forming the fastener 2 in accordance with the presently preferred method, there is first blanked out of the sheet metal spring stock, which is then in unhardened condition, a flat blank having a central main body portion with petal-shaped portions 10′ radiating therefrom; see Fig. 1 of Hotchkin U. S. Patent 2,288,710. The blank is then cupped into the shape shown in Fig. 15, with the portions 10′ disposed perpendicular to the base portion 12′ of the blank, an aperture 26′ being pierced through the bottom 12′ of the blank as is seen in Fig. 13. There are also provided, either in the same operation or in either subsequent or prior operations, equally spaced, radially extending V-cuts or grooves 30′, which are of such type that, when the metal is completely severed at the V-shaped grooves and subsequently formed, the resultant edges will provide the sharpened edges or ridges 31 (Figs. 4 and 6) in the finished fastener. Also provided in the base portion 12′ of the blank, in the embodiment shown, are further cuts, which provide the radially extending tangs 14′. Such tangs have their longitudinal axes aligned with the V-cuts 30′. Each pair of tang-forming slits begins at and is connected with the outer ends of one of the V-cuts 30′, the two slits of the pair being curved as shown to provide the rounded tip of a tooth 14, and then extending outwardly, in either parallel or non-parallel relation, to the line a′—a′. The tang-forming slits are preferably ones which remove little or no metal from the blank, being formed by striking out the tang from the surrounding metal. The tangs 14′ are first struck out in a direction into the paper in Fig. 13, bringing them into the position shown in Fig. 14, their inner ends 22′ being bent downwardly about the line 20′. In a subsequent operation, the tangs 14, are bent back substantially into the level of the base portion 12′ of the blank so that they form the teeth 14 occupying the described initial position of such teeth in the finished fastener.

The blank is then further subjected to a bending and drawing operation, whereby the approximately sector-shaped portions 16′ of the base portion 12′ are projected in a direction extending into the paper in Fig. 13 generally along the base arc of each which extends along the dotted circle B. The thus-projected sector-shaped portions 16′ form the teeth 16, being bent and drawn not only to extend in a direction perpendicular to the paper in Fig. 13 but also being curved in section perpendicular to the fastener axis and being provided with the two shaft-gripping zones b in the locations already described. Either in the same operation or in a subsequent one, the fastener is finish-formed by a bending operation involving the forcing of the upper ends of the petal-shaped portions 10′ together to form the dome 8 as shown in Fig. 1.

It will be understood that generally the same method may be employed in the formation of the fasteners 2a, 2b, and 2c. Such method is modified in each instance by the formation of an appropriately shaped blank; and by use of required shaping operations on the upper part of the fasteners 2a and 2c. The portions 48 of fastener 2c may be formed in the same manner as the formations 19 (Fig. 6) of Hotchkin U. S. Patent No. 2,381,352.

Although for purposes of illustration we have shown and described the presently preferred embodiments of the sheet metal push-on fastener of the invention and also of the presently preferred method of making the same, it is to be understood that the invention is capable of considerable variation as to details both as to the fastener and also the method of forming it.

We claim as new the following:

1. A threadless sheet-metal nut comprising: an annular web adapted to surround a male member; at least three radially-inwardly-extending resilient teeth having narrow bodies struck from the metal of said web, said teeth being homogeneous with the web and being located in their entirety close to the level of the web, the width of said teeth being small as compared to a semicircumference of the opening in said web and said teeth being equally spaced about said opening and being adapted to extend into gripping engagement with the smooth cylindrical surface of the male member on a first circle the plane of which is perpendicular to the axis of the male member; and additional resilient teeth homogeneous with the web, said additional teeth being also equally spaced about said opening and being interspersed with the first-mentioned teeth but the additional teeth beginning at the inner edge of the web and extending lengthwise of the male member in closely spaced relation thereto and thence bent inwardly for gripping engagement with the smooth cylindrical surface of the male member on a second circle the plane of which is perpendicular to the axis of the male member, the extent of said additional teeth lengthwise of the male member guiding the nut during its telescopic application to the male member and sustaining the force of side blows fortuitously imposed upon the nut after it has been telescoped onto the male member; and the inwardly-bent portions of said additional teeth lying on a circle which is at least as small as the circle on which the tips of said radially-inwardly-extending teeth lie.

2. A threadless sheet-metal nut as in claim 1 in which a hollow dome-shaped shell of springy sheet metal extends from the outer edge of the web and is homogeneous therewith.

3. A threadless sheet-metal nut as in claim 2 in which the top of the dome-shaped shell is provided with an opening that is adapted to telescope over the male member.

4. A threadless sheet-metal nut as in claim 3 in which the metal of the shell is curled inwardly at the edge of the opening in the top of the shell, and that opening makes a sliding fit with the male member.

5. A threadless sheet-metal nut as in claim 1 in which the metal of the web tightly engages both edges of the radially-inwardly-extending teeth throughout substantially their entire length.

6. A threadless sheet-metal nut as in claim 1 in which the inwardly-bent portions of the additional teeth have pairs of edges that are inclined downwardly in opposite directions and which make the engagement between the additional teeth and the male member.

References Cited in the file of this patent

UNITED STATES PATENTS

| | | |
|---|---|---|
| 312,943 | Winans | Feb. 24, 1885 |
| 1,602,217 | Wessel | Oct. 5, 1926 |
| 2,135,418 | Tinnerman | Nov. 1, 1938 |
| 2,246,022 | Tinnerman | June 17, 1941 |
| 2,248,226 | Friedrich | July 8, 1941 |
| 2,288,710 | Hotchkin | July 7, 1942 |
| 2,342,690 | Place | Feb. 29, 1944 |
| 2,381,352 | Hotchkin | Aug. 7, 1945 |
| 2,568,584 | Hartman | Sept. 18, 1951 |
| 2,577,319 | Feitl | Dec. 4, 1951 |
| 2,616,733 | Strange | Nov. 4, 1952 |

FOREIGN PATENTS

| | | |
|---|---|---|
| 650,062 | Great Britain | Feb. 14, 1951 |